(12) United States Patent
Rath et al.

(10) Patent No.: US 11,556,379 B2
(45) Date of Patent: Jan. 17, 2023

(54) PROTECT CLOUD OBJECTS FROM ATTACKS

(71) Applicant: EMC IP Holding Company LLC, Hopkinton, MA (US)

(72) Inventors: Jagannathdas Rath, Bengaluru (IN); Kalyan C. Gunda, Bengaluru (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 192 days.

(21) Appl. No.: 17/148,415

(22) Filed: Jan. 13, 2021

(65) Prior Publication Data

US 2022/0222074 A1    Jul. 14, 2022

(51) Int. Cl.
*G06F 12/02* (2006.01)
*G06F 9/48* (2006.01)
*G06F 11/07* (2006.01)

(52) U.S. Cl.
CPC ........ *G06F 9/4881* (2013.01); *G06F 11/0757* (2013.01); *G06F 11/0772* (2013.01); *G06F 12/0253* (2013.01); *G06F 2201/825* (2013.01)

(58) Field of Classification Search
CPC ............... G06F 9/4881; G06F 11/0757; G06F 11/0772; G06F 12/0253; G06F 2201/825
USPC ........................................................ 707/813
See application file for complete search history.

(56) References Cited

U.S. PATENT DOCUMENTS

| | | | |
|---|---|---|---|
| 5,526,524 A * | 6/1996 | Madduri | G06F 9/54 710/200 |
| 6,301,616 B1 * | 10/2001 | Pal | G06F 9/5022 718/104 |
| 7,212,731 B1 * | 5/2007 | Morotomi | H04N 5/225251 386/323 |
| 9,588,977 B1 * | 3/2017 | Wang | G06F 16/13 |
| 9,912,752 B1 * | 3/2018 | Davis | G06F 16/2365 |
| 9,959,280 B1 * | 5/2018 | Whitehead | G06F 16/13 |
| 10,540,508 B2 * | 1/2020 | Byun | G06F 21/6209 |
| 11,429,658 B1 * | 8/2022 | Richter | G06K 9/6215 |
| 2003/0093546 A1 * | 5/2003 | Roy | H04L 12/1881 709/231 |
| 2005/0273568 A1 * | 12/2005 | Blandy | G06F 12/023 711/170 |
| 2006/0020911 A1 * | 1/2006 | Lyons | G06F 9/526 717/101 |

(Continued)

FOREIGN PATENT DOCUMENTS

| | | | | |
|---|---|---|---|---|
| JP | 2010158038 A * | 7/2010 | ............ | G06F 16/73 |
| WO | WO-2009078870 A1 * | 6/2009 | ............ | G06Q 10/107 |

(Continued)

*Primary Examiner* — Phuong Thao Cao

(74) *Attorney, Agent, or Firm* — Womble Bond Dickinson (US) LLP

(57) ABSTRACT

A lock is applied automatically without any user involvement, to each of one or more data objects stored by the data processing system. Each of the one or more locks prevent deletion, by any user, of the one or more data objects within a predetermined time frame. A cloud garbage collector marks the one or more data objects for a) deletion, or b) for lock extension, the garbage collector scheduled to run periodically at a period that is less than the predetermined time frame. The deletion or the lock extension is executed for the one or more data objects, based on marks by the garbage collector. Other embodiments are described and claimed.

20 Claims, 5 Drawing Sheets

(56) References Cited

U.S. PATENT DOCUMENTS

| | | | | |
|---|---|---|---|---|
| 2007/0143792 A1* | 6/2007 | Acton | G06F 16/289 |
| | | | 725/50 |
| 2007/0162527 A1* | 7/2007 | Wright | G06F 12/0261 |
| 2010/0092160 A1* | 4/2010 | Bhogal | G11B 27/034 |
| | | | 386/241 |
| 2010/0318584 A1* | 12/2010 | Krishnaprasad | G06F 12/0253 |
| | | | 707/812 |
| 2011/0067084 A1* | 3/2011 | Byun | G06F 16/217 |
| | | | 726/4 |
| 2011/0225214 A1* | 9/2011 | Guo | G06F 3/0641 |
| | | | 707/813 |
| 2012/0066193 A1* | 3/2012 | King | G06F 12/0269 |
| | | | 707/704 |
| 2017/0139824 A1* | 5/2017 | Dragoljevic | G06F 12/0261 |
| 2018/0089110 A1* | 3/2018 | Zhou | G06F 9/526 |
| 2020/0326878 A1* | 10/2020 | Bora | G06F 3/067 |
| 2020/0334143 A1* | 10/2020 | Noto | G06F 9/505 |
| 2021/0165573 A1* | 6/2021 | Demoor | G06F 11/1415 |
| 2022/0207005 A1* | 6/2022 | Chenthamarakshan | |
| | | | G06F 16/22 |

FOREIGN PATENT DOCUMENTS

| | | | | |
|---|---|---|---|---|
| WO | WO-2015085787 A1 * | 6/2015 | | G06F 16/73 |
| WO | WO-2016148738 A1 * | 9/2016 | | G06F 17/00 |

* cited by examiner

PROTECT CLOUD OBJECTS FROM ATTACKS

TECHNICAL FIELD

Embodiments of the present disclosure generally relate to storage of data objects on the cloud. In particular, embodiments of the disclosure relate to a system that locks the data objects to protect them from malicious attacks.

BACKGROUND

Data has been recognized as an important asset for businesses today. Data can be stored on servers which can be cloud-based or reside in a local network. Backup for data can be stored in backup servers. Cloud storage is useful for direct backup applications, as well as for deduplicated backup applications, to store data off-premises for long term retention.

Data deduplication is a process that eliminates duplicate copies of data and significantly decreases storage capacity requirements. In the deduplication process, unique chunks of data, or byte patterns, are identified and stored during a process of analysis. During analysis, other data chunks can be compared to the stored copy to determine whether there is a match. When a match occurs, the redundant chunk can be replaced with a reference that points to the stored chunk, thereby reducing duplicate data. Given that the same byte pattern may occur dozens, hundreds, or even thousands of times, the total amount of data that must be stored or transferred can be greatly reduced.

In a backup system with deduplication, a file can be split into segments and these segments are deduplicated across all files in the system. The segments are compressed and packed. In some instances, the packed segments can be encrypted in regions in containers. These containers can be described or represented as an object (e.g., a data object) in the cloud. The size of these objects can vary (e.g., 1 MB-16 MB, with an average segment size of 64 KB-128 KB) depending on how many segments each object contains.

For direct backup systems (without deduplication), complete files can be moved as a single object or they are split and moved as multiple objects. This can vary based on system and application requirements.

Backup systems can have multiple policies that are defined based on, for example, when and which of the files or objects are to be stored to the cloud. For example, a policy can define that all files older than two weeks are to be automatically stored to cloud storage. The number of objects in the cloud collects over time, and customers rely heavily on the safe storage of such data.

As seen in the field, malicious attacks (e.g., ransomware attacks) have increased in number and severity, causing enormous harm to customers. Cloud storage can be vulnerable to such attacks. For example, a user's cloud credentials (e.g., a username and password, encrypted keys, etc.) can be compromised. Using such credentials, an attacker can take control of the cloud storage and destroy the data stored therein, from the cloud provider's console. Thus, a customer who relies on long term data storage can have their data destroyed as a result of stolen credentials. Thus, there is a need to protect data in the cloud, for example, if cloud credentials are compromised.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
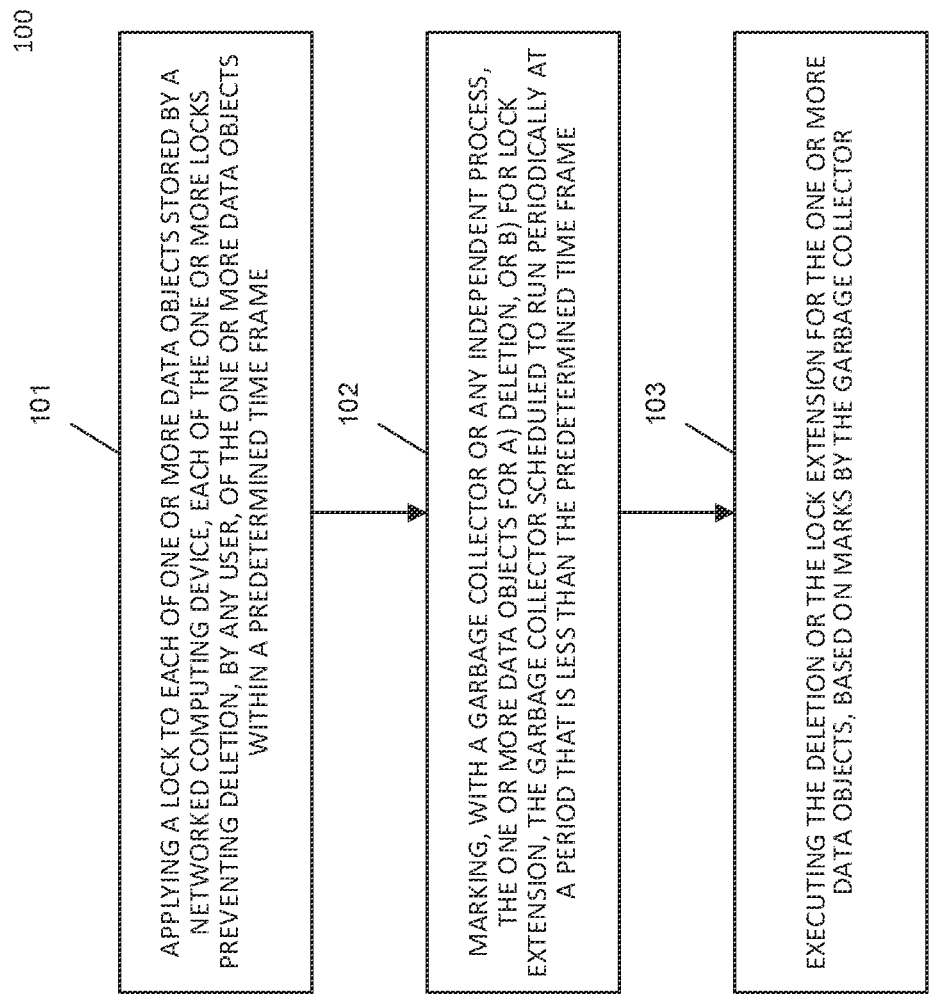
FIG. 1 shows a method for protecting data objects using a garbage collector, according to some embodiments.

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "some embodiments," "one embodiment" or "an embodiment" means that a particular feature, structure, or characteristic described in conjunction with the embodiment can be included in at least one embodiment of the disclosure. The appearances of the phrase "embodiment" in various places in the specification do not necessarily all refer to the same embodiment.

Cloud-based backup systems, also known as a data management system or a backup system, manage storage of data that is packed in objects in cloud-based storage (managed by a cloud-based provider/host). These objects, also referred to as data objects or cloud objects, carry data that customers rely upon for safe storage. The data manager (a server that includes hardware and software infrastructure) can include a backup application. The cloud-based provider that hosts the cloud-based storage can support object locks and legal holds. These locks and legal holds allow data objects to be locked for a certain period, or until a hold is removed (e.g., by a user). These locks and holds can prevent deletions of objects and can be accessed through a cloud storage console through one or more commands (e.g., API calls). Functionality for locking objects that support immutability or retention lock can comply with SEC 14 a-f standards.

Unfortunately, manually locking objects in compliance mode from cloud provider's console, using object life cycle management configuration, or using legal holds or non-compliance modes of object lock are not feasible solutions to address the problem of stolen credentials. Non-compliance modes of object locking, or legal holds can be removed from objects by an attacker having cloud storage administrator credentials. The objects can then be deleted by the attacker. Further, locking each object manually in compliance mode would involve an excessive amount of manual management and incur unnecessary costs based on the lock duration (e.g., an excessively long period of time that takes up storage unnecessarily). Further, objects can have different durations and thus, such a solution would require locking each object for different set periods, manually.

Thus, an efficient mechanism is needed to secure cloud objects from malicious attacks, for example, when cloud storage credentials are compromised. In some embodiments, a cloud backup system can have a compliance mode (a mode that applies locks that cannot be removed by any user) that efficiently locks objects from within the backup system in a controlled, automated and logical manner (rather than a large fixed duration). Object locking, lock duration, deletions, and more, can be defined, controlled, and managed by a cloud-based process like garbage collector or any specific independent process, that can be integrated as part of the backup system. In such a case, an attacker cannot delete an object that is backed up, even with stolen credentials. Additionally, the system ensures that objects are not locked unnecessarily for long durations of time.

According to some embodiments, a computer-implemented method is shown in FIG. 1. The method can be performed by a cloud-based backup system which can include one or more computing devices such as a networked computer (e.g., a server), a laptop computer, a desktop computer, a mobile device, or other electronic device.

At operation 101, the method includes applying a lock to each of one or more data objects stored by a networked computing device, each of the one or more locks preventing deletion, by any user, of the one or more data objects within a predetermined time frame. For example, all objects that are stored to the backup cloud server can be locked under compliance mode for a specified time frame (e.g., N days). The lock expires after the duration.

At operation 102, the method includes marking, with a garbage collector (e.g a cloud garbage collector or any independent process), the one or more data objects for a) deletion, or b) for lock extension. The garbage collector is scheduled to run periodically at a period that is less than the predetermined time frame (e.g., the duration of the lock). The predetermined time frame can be enforced based on expiration of each of the one or more locks. This expiration is common to all data objects and their respective locks.

For example, the locks can each last for N days, where N is determined based on when the next garbage collection run will occur, plus an additional amount of time that serves as a buffer. In such a case, if the garbage collector is scheduled to run periodically every thirty days, and the buffer is set to five days, then the objects would be locked for 30+5 days. All the objects marked for lock extension can have their lock extended by the same duration, which can be determined during run-time (for example, with each garbage collection run). Objects that are marked for deletion do not have their locks extended. Thus, their locks will expire, at which point they can be deleted.

In some embodiments, the buffer time is determined based on an estimated or calculated time to perform garbage collection of the one or more data objects. For example, if garbage collection takes two days (or is estimated to take two days, depending on the amount of data stored), then the buffer time would be at least two days. In other words, the predetermined time frame can be greater than a sum of a) the period of the scheduled garbage collector, and b) an estimated or calculated time to perform garbage collection of the one or more data objects.

The buffer value can be configurable and can have values like one day, two days, three days, or more, based on how much time the garbage collector takes to complete and/or delays that are anticipated. This buffer value can also be determined dynamically by the system based on the amount of data to clean and the time taken in past garbage collector runs. The buffer ensures that even if there is a delay in starting or completing a garbage collection run, which can be common, the objects are not left unlocked or exposed to deletion windows.

Garbage collection is an automated way to reclaim storage that is no longer in use. The reclaimed storage can be put back to use for newer data. The garbage collector can be a process or series of processes having dedicated resources to perform operations to reclaim storage space. A cloud garbage collector reclaims space occupied by computer readable data (e.g., storage space utilized by cloud objects) that exists on and is accessible through 'the cloud', which refers to servers and computer system resources that are available over the internet. A garbage collection execution or run refers to a sweep or iteration through all data objects to select and reclaim space from unused objects.

When the garbage collector executes, it can iterate all data objects and process them to determine how the space can be reclaimed. The garbage collector marks each of the one or more objects for deletion or for lock extension. For example, data objects comprise 'segments' of data that can be live or dead. Live segments refer to data that the user wishes to keep. For example, if data of a virtual machine is present in a host, then this data may be 'backed up' and stored as segments in the objects on the cloud. After the data of the virtual machine is no longer present (e.g., it is deleted), then those segments relative to the data may become 'dead', unless those segments are also referred to by other data (identical data can share the same segments). In some cases, a backup policy may require that, even for data that is deleted, the backup for the deleted data is kept for a predetermined period of time (e.g., two weeks). After the expiration of such time, if no other data refers to such segments, then they can be deemed as 'dead'. As such, the status of segments in objects change over time as changes occur in the system that is being backed up. For example, some objects contain only live segments, others can contain a mix of live and dead segments, while others contain only dead segments.

When the garbage collector runs, the objects that contain only live segments have their locks extended. For objects having both live and dead segments, the garbage collector can copy those live segments from these mixed objects to a newly created object, such that the new object contains only live segments. The new object can be marked for lock extension. Those mixed objects and objects containing only dead segments (e.g., no longer referenced) can then be marked for deletion. As such, the storage space used by the mixed objects are compacted to the newly created objects, and those mixed objects are deleted, in a process known as 'copy-forward'. In this manner, memory from mixed objects and completely dead objects are reclaimed. Marking of an object for deletion or lock extension can be performed by maintaining a list of objects to be deleted and/or a list for objects that are to be extended or bitmaps. Other data structures can be used as well.

New objects moved to the cloud can also be locked for the same predetermined time frame, so that next garbage collector has all objects locked for the same amount of time. The garbage collector interval can be modified, and in such cases, the method can ensure that objects are not exposed to deletion windows between sequentially scheduled garbage collector runs, as described further in other sections.

The lock's expiration time frame can be calculated and specified by the garbage collector, in a completion record (which can be stored locally). This can be performed at the end of each garbage collection run. All processes, such as new data or objects that are moved to the cloud, lock duration extensions after every garbage collector run, etc., will use this lock duration, until the next garbage collection run when the completion record is updated again.

At operation 103, the method includes executing the deletion or the lock extension for the one or more data objects, based on marks by the garbage collector. Independent background threads (e.g., one or more deletion threads and one or more lock extension threads) can asynchronously execute the object deletion and object lock extension for each object. In this manner, the garbage collector can iterate through the objects quickly while offloading the actual deletion and lock extensions. Objects are locked for a maximum duration, equal to the time between adjacently scheduled garbage collector runs, plus the buffer time. This ensures that all the objects are uniformly locked with a common expiration date. Also, any new incoming data/objects written to cloud would also get locked automatically for the duration decided by the last garbage collector run. That would ensure that both new and existing cloud objects are protected until the next scheduled garbage collector run.

As such, the data objects stored on the cloud can be locked in an automated and controlled manner in such a way that a garbage collector is the sole controller of the object locks. Deletion can happen only as a decision of the garbage collector, and only after a lock expiration time has lapsed. By periodically marking objects for deletion or lock extension, this ensures that objects are not simply locked for very long duration (e.g., years) which would like for years to achieve protection. As discussed, the protection of objects with locks is performed automatically, without requiring a user to setup or manage a Retention Lock policy.

Figure 2:
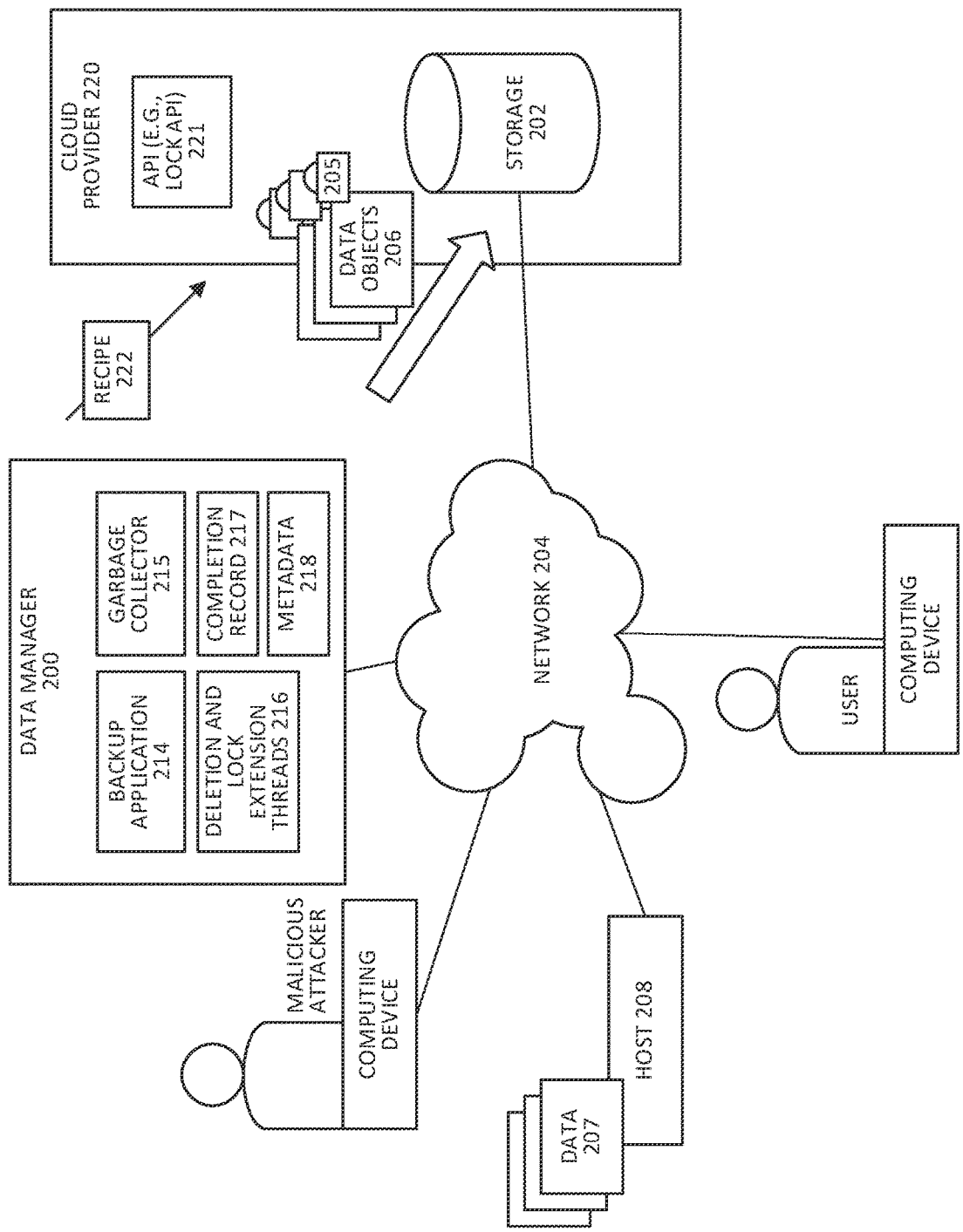
FIG. 2 shows an example of a backup solution, according to some embodiments.

A cloud-based backup system is shown in FIG. 2 that can protect a backup application's cloud objects from being deleted by malicious attackers by implementing the method described with regard to FIG. 1. It should be understood that this example is non-limiting, as the method shown in FIG. 1 can be applied in different architectures and situations.

Data manager 200 manages backup of data 207 for a host device 208 which can be any networked computing device with data that requires backup. The data is packed in one or more data objects 206 that are stored in cloud storage 202 managed on the cloud by cloud provider 220 which can reside on the network 204

As described, the data manager can run a backup application that behaves as a straight forward one to one backup system for the host, or use deduplication to reduce redundancy. The data manager 200 can include a backup application module 214 that includes logic, algorithms, and other instructions, that can be executed by the garbage collector 215 and deletion and lock extension threads 216. The backup application can include general backup functionality such as one or more deduplication algorithms that reduce storage or redundant data, or splitting chunks into multiple objects in case of non-dedupe backups, and other functionality.

The garbage collector 215 can be a cloud garbage collector. It can be integrated as part of the data manager (as shown) or running on a separate networked computing device. As described, the garbage collector can be scheduled (e.g., by an administrator) to periodically iterate through the data objects 206 that are stored in storage 202 to mark the objects for object extension or for deletion. The garbage collector can refer to metadata 218 which can include information about each of the data objects 206 that are kept in storage. This reduces the cost of the garbage collection operation. If not for the local metadata, then the garbage collector would have to communicate messages back and forth with the cloud provider to determine status of each object, which would be costly. Based on processing this metadata, the garbage collector can determine the status of each of the data objects, e.g., which objects contain live segments, a mix of live and dead segments, or only dead segments. It should be understood that the operations described herein as being performed by a garbage collector (e.g., such as those described with respect to FIG. 1) can, in some embodiments, instead be performed separate by an independent process or thread separate from the garbage collector.

The data manager can operate in a multi-threaded environment. Thus, the data manager can have one or more deletion threads that are dedicated to performing deletion of objects marked for deletion, and one or more lock extension threads that extend the locks for objects marked for extension. The number of threads can vary based on application.

A malicious attacker (e.g., a hacker) can steal the cloud credentials of a user and use these credentials to control and perform operations in the cloud provider's console. The malicious attacker may try to delete the data objects in the cloud storage. As mentioned, however, the garbage collector can periodically lock the data objects in compliance mode, and these locks are not removable by the malicious attacker. Thus, even with credentials, the attacker cannot destroy the backed up data.

Figure 3:
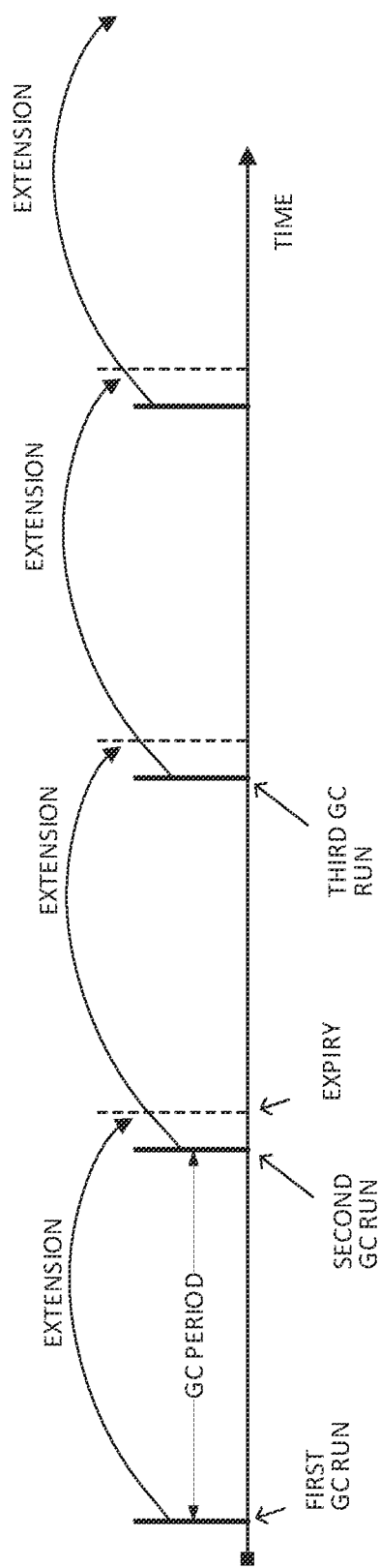
FIG. 3 shows a diagram for data protection, according to some embodiments.

Each data object can have a respective lock 205 with an expiration (which can include a time, date and/or time duration). The locks can be supported by the cloud provider 220. The cloud provider can include one or more APIs 221 from which the locks can be controlled (e.g., created and extended). The expiration of each lock can be set so that they each lock expires at the same time for each object. When the garbage collector runs, it can calculate the next lock extension date time (e.g., based on the scheduled intervals of the garbage collector) for both newly moved objects and the objects marked for extension by current garbage collection run. This would ensure that all objects expire at the same time within an interval, ensuring consistent results. FIG. 3 shows an example of how the locks are extended, relative to garbage collection intervals.

FIG. 3 shows a diagram illustrating garbage collection periods and lock extension. In this example, the garbage collector is scheduled to run for a period (e.g., every 30 days, the first of each month, every Monday, etc.). During the first garbage collector run, the garbage collector can mark some objects for lock extension, and some for deletion. One or more threads can then delete those objects marked for deletion, and extend locks for those marked for extension.

The life of the lock can be determined as the period of the garbage collector (e.g., 30 days), plus a buffer time (e.g., 5 days). In other words, the lock extension can be set as i) a time period greater than the period of the garbage collector, or a time period greater than the period of the garbage collector but less than two periods of the garbage collector. For example, assuming the first scheduled run of the garbage collector is on 1 Apr. 2020 12:00:00, the garbage collector can determine the next expiration as 1 Apr. 2020 12:00:00+ 30 days+5 days, which equals 5 May 2020 12:00:00. All objects marked as "to-be-extended" in this garbage collection run would be locked until 5 May 2020 12:00:00. New objects, which can be created as a result of a new backup ingests (either deduped or non-deduped) would also have locks with the same expiry time as the existing objects. For example, objects created between the first garbage collection run and the second garbage collection run would be created with locks that expire on 5 May 2020 12:00:00.

In this example, the second scheduled garbage collection run would occur on 1 May 2020 12:00:00. The garbage collector can determine the next expiration of the locks as 1 May 2020 12:00:00+30 days+5 days, which equals 4 Jun. 2020 12:00:00, which would again occur 5 days after the third garbage collection run.

Locking (or lock extension) can be performed in 'Compliance mode', also known as 'Immutable mode'. In this manner, even an administrator (or anyone with cloud storage admin level credentials) cannot remove or revert the locks. Locks on the objects can only be extended and not reduced. An object can be deleted only after the lock expiry. A cloud provider's object Lock APIs can provide the calls used to perform the locking.

Referring to FIG. 2, when the garbage collector 215 runs, it would iterate through all the cloud objects 206, (e.g., by reading the local metadata), process them, perform any necessary copy-forwards and/or other garbage collector tasks, which can be defined by the backup application. The garbage collector can perform the cloud garbage collection by sending instructions to the cloud provider that specify new objects to create, what data segments to copy forward to the new objects, and which objects to delete. These instructions can be sent as a 'recipe' 222. The scheduled garbage collector can be initiated by a user (e.g., with admin credentials).

For objects that do not need any change, the garbage collector can mark them as "to-be-extended". And for objects which are decided to be deleted (e.g., they have no 'live' segments that are referenced by a host), the garbage collector can mark them as "to-be-deleted". Here the objects can be marked either by setting specific flags or maintaining separate lists of object ids or related meta info i.e. one for "to-be-extended" and one for "to-be-deleted" and any other such method to identify them as per the backup application's implementation.

Deletion and lock extension threads 216 can use these flags or the specific identifying method to determine objects for extending the locks or deleting them. In some cases, a user (e.g., operating on a networked computing device) may wish to modify the garbage collector frequency/interval. Regardless of whether the new interval is greater or lesser than the older interval, the first garbage collection run after this change will still be executed based on the last interval as scheduled.

For example, referring to FIG. 3, assume that the first garbage collector run is performed with the interval of the garbage collector set to 30 days. Then, the user changes the interval to every 60 days. The second garbage collector run will still occur 30 days after the first garbage collector run. This ensures that second garbage run occurs while all the objects are yet to expire. The lock extension during this second garbage collector run will be done for a duration based on the garbage collector interval (e.g., 60 days+buffer time) rather than the previous interval of 30 days. In such a manner, objects are not left unlocked or in expired state.

Referring to FIG. 2, in some embodiments, the garbage collector can maintain a garbage collector completion record 217. Each garbage collection run, on completion, can store completion metrics locally. Completion metrics can include, for example, 'Time of start and end of the garbage collection run', 'Execution status (e.g., success, failure)', 'number of objects found to be deleted', 'Max Time remaining for all the objects to expire', 'number of objects found to be extended', 'new lock duration (e.g., date & time) that is applied on the objects until the next garbage collector run', 'error codes or logged messages, (e.g., in the case of a failure)', and more. These records can be kept in persistent storage such as, for example, a digital file, a database, a registry, or other suitable format of computer readable memory. The backup application and deletion and lock extension threads can access these records when needed to perform their respective functions. The garbage collector can update these records whenever a run is complete, given proper locking constructs.

As mentioned, the data manager can include deletion threads and lock extension threads, shown collectively as deletion and lock extension threads 216. The deletion threads can perform the function of deleting objects in storage. The lock extension threads perform a different function, extending locks for objects. The deletion and lock extension threads (or processes) can operate asynchronously with respect to each other and with respect to the garbage collector. Thus, each thread (or process) and the garbage collector can perform its dedicated duties in a non-blocking manner.

The one or more deletion threads or processes (which are independent of the garbage collector) can iterate the meta data of the cloud objects (for performance reasons the backup applications can keep a copy of the cloud metadata locally as well apart from the cloud copy) and delete the objects marked as "to-be-deleted", as soon as the locks of those objects are expired. The deletion thread can issue deletion requests if a) there exists one or more objects to be deleted, and b) the current time is passed the max expiry time of the object locks. Otherwise, the deletion thread can cease operation, e.g., put itself to sleep. In this manner, the deletion thread does not waste resources if no objects are marked for deletion or if the objects are still locked. In some embodiments, if there are objects yet to expire but marked for deletion, the delete thread can note this (e.g., store reference to the object) and delete the object as soon as the corresponding lock expires, after that much amount of time. For example, the delete thread can wake up after that much time elapses and then issue delete requests.

The one or more lock extension threads can run in a coordinated manner with the garbage collector (e.g., after a garbage collection run is complete). The thread can identify the objects marked as "to-be-extended" (e.g., by referring to the metadata of the cloud objects, again preferably the local metadata if present, or else the metadata in the cloud), and extend the lock on those objects. In some embodiments, the thread can utilize API of a cloud provider to call a request that extends the duration of a lock.

The execution of the deletion and lock extension threads can be configured so that they run in a desirable and streamlined manner. For example, the lock extension thread can run before/after the deletion thread, or even along with the deletion thread. This can vary between applications, for example, based on hardware or architecture of the system or load of the system, or other factors. With millions of objects, the time taken to extend the lock on the many objects can take time.

The lock extension thread can execute in coordination with the garbage collector. For example, as soon as an object lock is identified to be extended by the garbage collector, the garbage collector can cause the lock extension thread to run, which will extend the lock in parallel to the garbage collector run. Some standard optimization can be done to reduce communication between threads and cloud, such as, for example, batch operations and lambda methods discussed in other sections.

Figure 4:
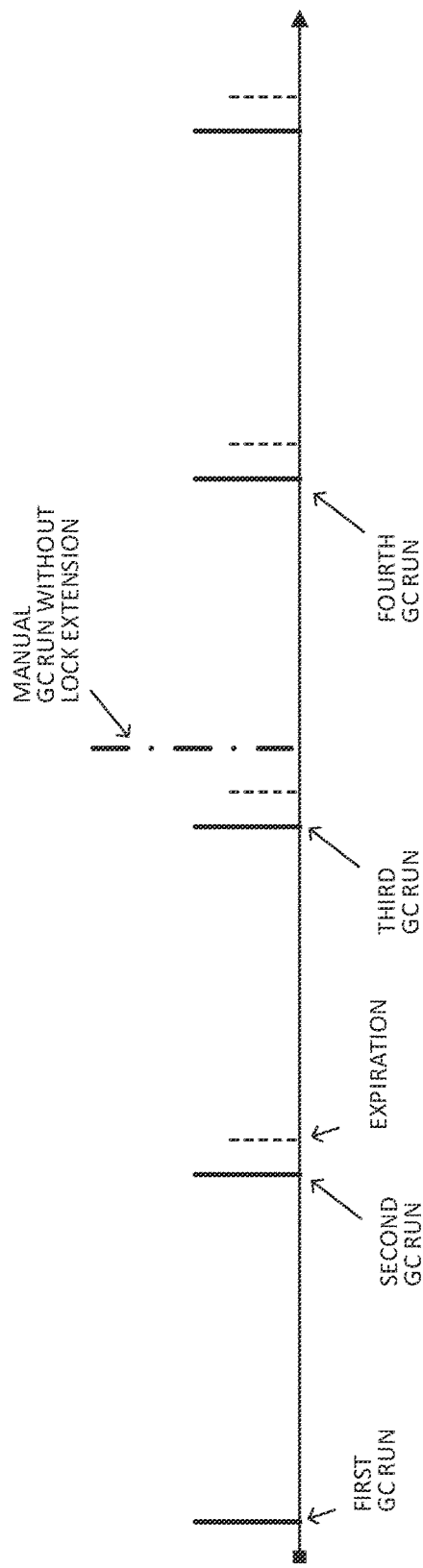
FIG. 4 shows a diagram for data protection with respect to a manual garbage collection run, according to some embodiments.

In some embodiments, garbage collection can be performed manually, as shown in FIG. 4. For example, a user with admin credentials can manually trigger a garbage collection run between existing scheduled garbage collection runs (e.g., the third run and fourth run as shown). In this case, during the manual run, the garbage collector can perform typical functionality such as marking items for deletion. The marked objects will be deleted by the deletion thread once the lock for the marked objects expire. Lock extension for objects, however, are not performed during the manual garbage collection run. The next scheduled garbage collection run (e.g., the fourth run) would perform the marking for lock extension and deletion, as described in other sections. Otherwise, locking during manual garbage collection runs could result in unnecessary redundant operations. There are some instances, however, where a manual garbage collection does perform lock extension, as described below.

In some embodiments, there can be a configuration option in the system where the user can configure if a manual garbage collection run would perform lock extension or not. If this is configured to yes, then whenever garbage collection is executed manually, it would perform the extensions of the locks on the objects from that point of time. Object deletion would however be done as usual i.e. once after the objects expire.

In another embodiment, the system can decide dynamically whether to perform lock extension or not, on every manual garbage collector run. It can do so by verifying the amount of time left for the next scheduled garbage collector run and the lock duration. If all the objects are still going to remain locked until after the next garbage collector run, then lock extension won't be done by the manual garbage collector run. But, if one or more objects are going to expire before the next scheduled garbage collector run, then the lock extension will be performed by the manual garbage collector run. Object deletion would however be done as usual i.e. once after the objects expire.

Figure 5:
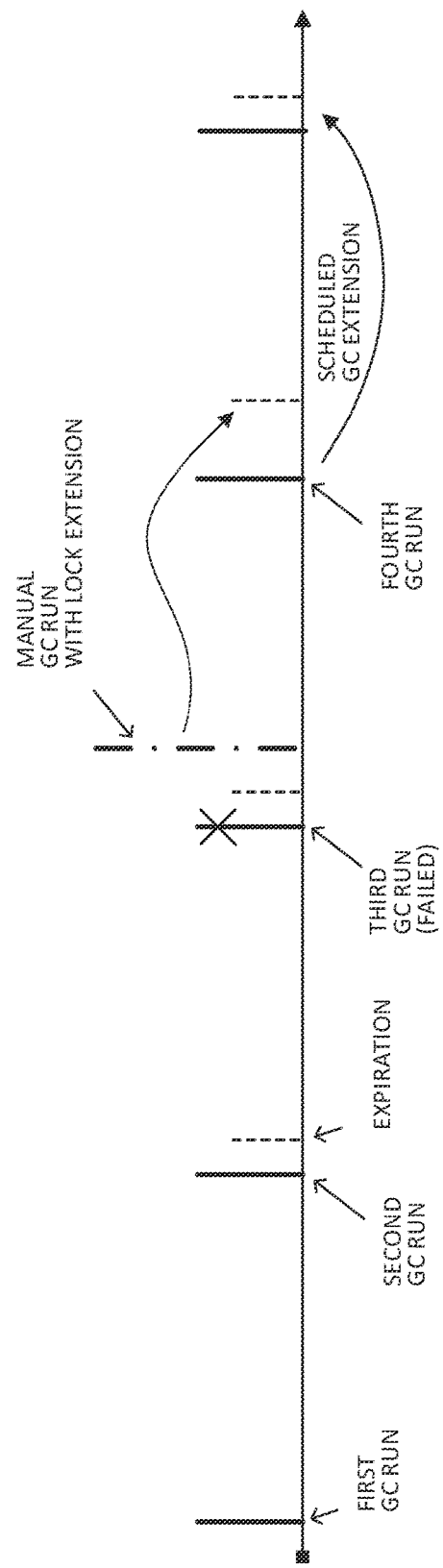
FIG. 5 shows a diagram for data protection with respect to a manual garbage collection run and a failed scheduled garbage collection run, according to some embodiments.

In some embodiments, as shown in FIG. 5, a manual garbage collection run may perform lock extension to correct a failed scheduled garbage collection run. For example, if a scheduled garbage collection run (e.g., the third run) fails to complete, then there is a chance some objects did not have their locks extended. Such objects could then be at risk of being deleted by an attacker. As discussed, the status of garbage collection runs can be stored, such as in the completion record, or other data structure. As such, when a manual garbage collection run is initiated, the status of the most recent garbage collection run can be referenced to determine whether or not the most recent scheduled garbage collection run failed to complete.

If it is determined that the most recent scheduled garbage collection run failed, then the manual garbage collection run can perform all activities that a scheduled garbage collection run would have performed, including creating a completion record, marking objects for lock extension and deletion, and initiating deletion and lock extension threads. As such, in some embodiments, in response to execution of a manual garbage collector, the lock extension is not performed, unless the manual garbage collector is executed in response to a failure of the garbage collector that is scheduled to run periodically, as is the case in the FIG. 5 example. Also, if the scheduled garbage collector fails due to some reason and locks on the objects are not extended as planned, then the system can provide a command line interface (CLI) or graphical user interface (GUI) or any suitable method by which the lock on all objects will be extended automatically until the next garbage collector run. So, either of the manual garbage collector run or the independent extension method can be used by the admins to extend the locks automatically in case of a scheduled garbage collector failure. This option can be configurable as well to be triggered automatically, e.g. if a scheduled garbage collector fails, then a user can execute garbage collector manually, or execute the extension method immediately.

In some embodiments, in response to a failed garbage collection run, a notification can be sent by the backup application to a user, such as, for example, in the form of an alert notification, email, a pop-up message on a display, or other digital notification. The alert can include a prompt to the user (e.g., an administrator) to trigger a manual garbage collection run as soon as possible. The notification can be sent periodically until a garbage collection run (manual or scheduled) is performed and executes successfully.

Referring to FIG. 2, if a malicious attacker has user credentials, then she may try to disable the garbage collector. If this is allowed, then the locks would eventually expire, leaving the objects vulnerable. Thus, in some embodiments, once the scheduled garbage collection is enabled, it cannot be disabled. In other words, the backup application can lock the scheduled garbage collection, so that the garbage collector cannot be canceled by anyone, regardless of credentials.

The intervals of a scheduled garbage collector can be modified (e.g., any amount of days, hours, etc.), but upper limits (e.g., 1 year, 6 months, etc.) and/or lower limits to this interval can be defined and stored in system settings. The scheduled period can be modified as and when needed to any amount of days, hours, etc., with one or more admin controls (e.g., command line, API calls, etc.). As discussed, whenever a schedule interval is changed, the subsequent garbage collection run still occurs based on the previous interval, thus ensuring that objects remain protected. As such, even an attacker having stolen backup and cloud storage credentials cannot disable future garbage collection runs with the hopes of deleting the objects when the locks expire. In some embodiments, a notification (e.g., an alert, pop-up message, email, etc.) can be communicated to one or more users (e.g., administrators) in response to when the period of a scheduled garbage collection is modified.

In some embodiments, batch operations can be used to lock numerous objects in a single Cloud API call. Batch operations are supported by some public cloud providers (e.g., servers). In such a case, the deletion and lock extension threads can a) iterate the local metadata and get the object IDs that are marked as 'to-be-extended' or 'to-be-deleted', respectively; b) create and trigger batch operations for "object lock" or "object delete" requests for up to the maximum allowed number of objects in one batch. This reduces the total number of cloud requests/transactions from the backup application, thereby decreasing the overall time of the operations.

In some embodiments, object deletion and lock extension is performed using a cloud-based compute service. Different cloud providers can provide different ways to execute functions within the cloud. For example, Lambda functions are provided by Amazon Web Services (AWS). An 'object delete' function can be defined in the cloud provider's space to perform as an object deletion thread. Similarly, a 'lock extend' function can be defined in the cloud provider's space to perform as a lock extension thread.

The deletion thread (local to the data manager) can parse the local metadata and get the list of object ids marked as "to-be-deleted" and call the deletion function with the list of object IDs. The object delete function can receive, as input, the list of object IDs to be deleted and delete them by issuing delete API calls or via batch operations.

The lock extension thread (local to the data manager) can similarly parse the local metadata and get the list of objects marked as "to-be-extended", read the completion record, retrieve the new lock duration, and eventually call the "lock extension function" with the list of IDs and new lock duration. The lock extension function can receive a) the list of object IDs whose lock duration has to be extended, and b) the new duration (date time). The function can extend the locks with individual API calls (e.g., a PUT or POST call) or via batch operations within the cloud.

By utilizing a cloud provider's compute functions, this can drastically reduce the number of cloud transactions initiated by the backup application and can reduce the overall time greatly. This can be done for public providers, however, for private providers the backup application can fall back to extending locks by directly invoking the cloud APIs, unless the private cloud providers also provide similar compute services.

With the techniques described, a backup application can use compliance locking mode (which can be a feature provided by cloud providers) to form a logical protection layer around the data objects. Such a lock cannot be removed by anyone until the lock expires. All types of attackers, including those with compromised admin credentials, cannot delete these objects. The locks are extended periodically for only the duration required, rather than a brute force approach of using a compliance lock that last for years, thereby preventing any unnecessary cloud costs. Space reclamation is not restricted by the garbage collector in any manner, while providing the required protection. Continued protection of objects is ensured even for cases where the garbage collection fails abruptly, or is disabled (e.g., by an attack). The objects are secured in the cloud without requiring manual process/intervention/locking. Such features can be implemented using directly in the cloud (e.g., using cloud-based compute service) for deleting objects and extending the object locks. As such, overall number of cloud transactions can be reduced, thereby reducing the overall execution time.

Existing backup applications (dedupe and non-dedupe) are lacking in protection of data objects from attacks that originate from the cloud storage provider's console (which can be accessed with compromised credentials). Anyone with the cloud admin credentials can login and delete all the objects rendering a serious data loss.

Figure 6:
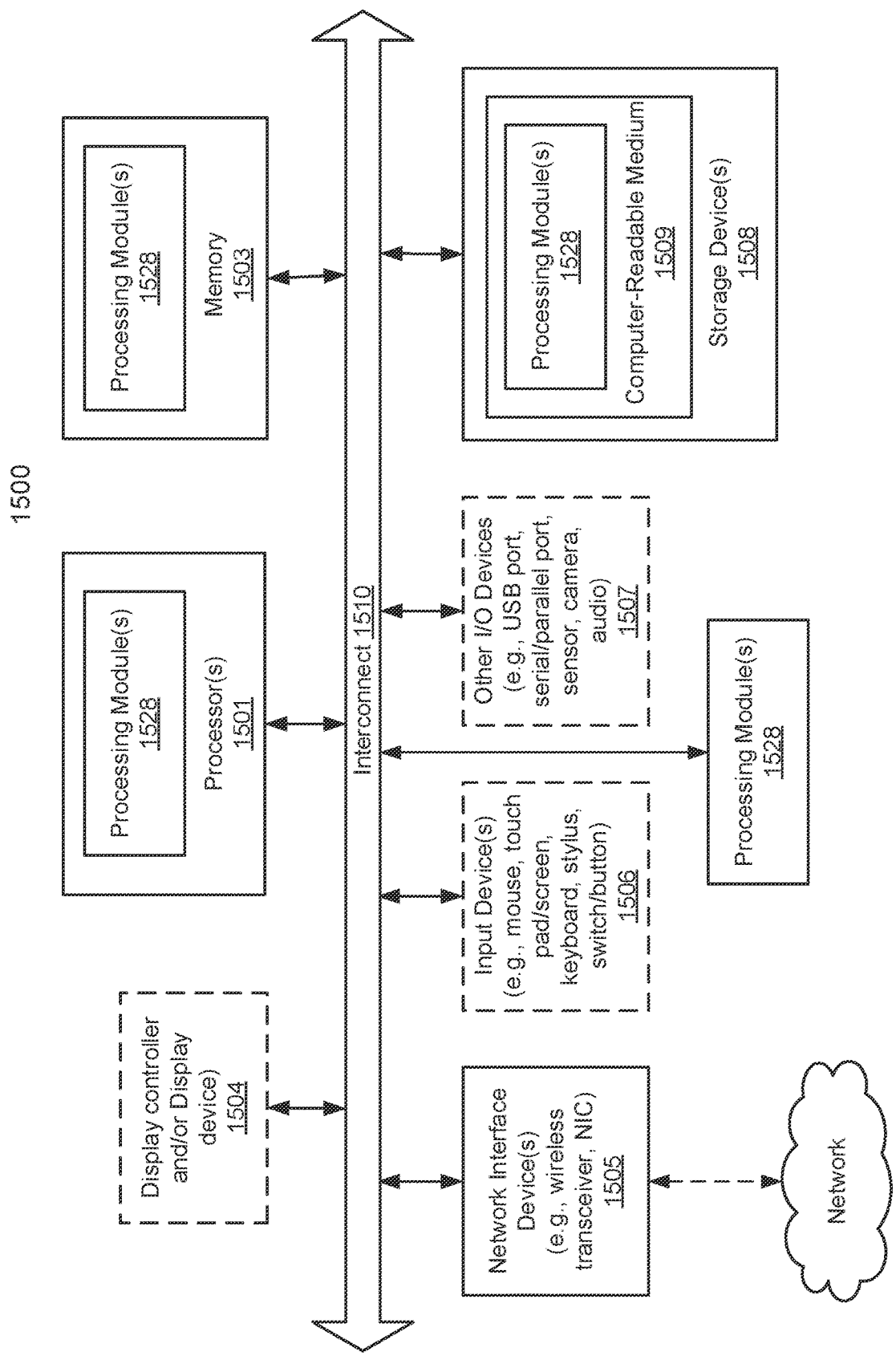
FIG. 6 shows an example data processing system, according to some embodiments.

FIG. 6 shows an example data processing system, according to some embodiments. This example data processing system, which can be described as a computing system, may be used in conjunction with one or more embodiments of the disclosure, such as for performing the method described in FIG. 1, and/or as a data manager as described in FIG. 2.

For example, system 1500 may represent any of data processing systems described above performing any of the processes or methods described above. System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 1501 may be configured to execute instructions for performing the methods, processes, operations, functions, etc. as discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include various electronic displays (e.g., a monitor having a screen, a small LCD touch-screen or any other electrical device that is operable to display information), audio output (such as speakers). An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-readable storage medium 1509 (or machine-readable storage medium, computer-accessible medium, etc.) on which is stored one or more sets of instructions or software (e.g. processing modules 1528) embodying any one or more of the methods, processes, operations, functions, etc. as described herein. In addition, the computer-readable storage medium 1509 may also include removable or portable media (e.g. magnetic disk storage media, optical storage media, USB media, CD-ROM, flash memory devices, etc.).

Processing modules 1528 (or component/unit/logic) may represent any of the components of configuration 100 (e.g. risk management manager 106, deduplication logic 107, etc.). Processing modules 1528 may also reside, completely or at least partially, within memory 1503 and/or within processor 1501 during execution thereof by system 1500, memory 1503, and processor 1501, which may also constitute a computer-readable storage medium. In addition, processing modules 1528 can be implemented as firmware or functional circuitry within hardware devices. Further, processing modules 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

The processes or methods depicted in the preceding figures may be performed by processing logic that comprises hardware (e.g. circuitry, dedicated logic, etc.), firmware, software (e.g., embodied on a non-transitory computer-readable storage media), or a combination of both. Although the processes or methods are described above in terms of some sequential operations, it should be appreciated that some of the operations described may be performed in a different order. Moreover, some operations may be performed in parallel rather than sequentially.

The term "approximately" or "substantially" may be used herein and may be interpreted as "as nearly as practicable," "within technical limitations," and the like. In addition, the use of the term "or" indicates an inclusive "or" (e.g. "and/or") unless otherwise specified.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
    applying a lock to each of one or more data objects stored by a networked computing device, each of the one or more locks preventing deletion, by any user, of the one or more data objects within a predetermined time frame;
    marking, with a garbage collector, the one or more data objects for a) deletion, or b) for lock extension, the garbage collector scheduled to run periodically at a period that is less than the predetermined time frame; and
    executing the deletion or the lock extension for the one or more data objects, based on marks by the garbage collector.

2. The method of claim 1, wherein executing the deletion or the lock extension of the one or more data objects is performed with one or more independent background threads, separate from the garbage collector.

3. The method of claim 1, wherein, in response to execution of a manual garbage collector, the lock extension is not performed, unless the manual garbage collector is executed in response to a failure of the garbage collector that is scheduled to run periodically where the one or more data objects expire before a next scheduled garbage collector run, or based on configuration of a lock extension setting.

4. The method of claim 1, wherein the garbage collector that is scheduled to run periodically is locked to prevent cancellation.

5. The method of claim 4, wherein if an input is received to modify the period of the garbage collector that is within an upper limit, then a first garbage collection run after the input is received is performed based on the period, and subsequent garbage collection runs are performed based on the modified period.

6. The method of claim 1, wherein the predetermined time frame is greater than a sum of a) the period, and b) an estimated or calculated time to perform garbage collection of the one or more data objects.

7. The method of claim 1, wherein the predetermined time frame is an expiration of each of the one or more locks that is common to all data objects stored, including new data objects that are created between adjacent garbage collector runs.

8. A non-transitory computer-readable medium storing instructions which, when executed by one or more processors of a networked computing device, cause the computing device to perform operations comprising:
    applying a lock to each of one or more data objects stored by the networked computing device, each of the one or more locks preventing deletion, by any user, of the one or more data objects within a predetermined time frame;
    marking, with a garbage collector, the one or more data objects for a) deletion, or b) for lock extension, the garbage collector scheduled to run periodically at a period that is less than the predetermined time frame; and
    executing the deletion or the lock extension for the one or more data objects, based on marks by the garbage collector.

9. The non-transitory computer-readable medium of claim 8, wherein executing the deletion or the lock extension of the one or more data objects is performed with one or more independent background threads, separate from the garbage collector.

10. The non-transitory computer-readable medium of claim 8, wherein, in response to execution of a manual garbage collector, the lock extension is not performed, unless the manual garbage collector is executed in response to a failure of the garbage collector that is scheduled to run periodically where the one or more data objects expire before a next scheduled garbage collector run, or based on configuration of a lock extension setting.

11. The non-transitory computer-readable medium of claim 8, wherein the garbage collector that is scheduled to run periodically is locked to prevent cancellation.

12. The non-transitory computer-readable medium of claim 11, wherein if an input is received to modify the period of the garbage collector that is within an upper limit, then a first garbage collection run after the input is received is performed based on the period, and subsequent garbage collection runs are performed based on the modified period.

13. The non-transitory computer-readable medium of claim 8, wherein the predetermined time frame is greater than a sum of a) the period, and b) an estimated or calculated time to perform garbage collection of the one or more data objects.

14. The non-transitory computer-readable medium of claim 8, wherein the predetermined time frame is an expiration of each of the one or more locks that is common to all data objects stored, including new data objects that are created between adjacent garbage collector runs.

15. A data processing system, comprising:
  computer-readable memory; and
  a processor that executes instructions stored on the computer-readable memory, causing the data processing system to perform operations including:
    applying a lock to each of one or more data objects stored by the data processing system, each of the one or more locks preventing deletion, by any user, of the one or more data objects within a predetermined time frame;
    marking, with a garbage collector, the one or more data objects for a) deletion, or b) for lock extension, the garbage collector scheduled to run periodically at a period that is less than the predetermined time frame; and
    executing the deletion or the lock extension for the one or more data objects, based on marks by the garbage collector.

16. The data processing system of claim 15, wherein executing the deletion of the lock extension or the one or more data objects is performed with one or more independent background threads, separate from the garbage collector.

17. The data processing system of claim 15, wherein, in response to execution of a manual garbage collector, the lock extension is not performed, unless the manual garbage collector is executed in response to a failure of the garbage collector that is scheduled to run periodically where the one or more data objects expire before a next scheduled garbage collector run, or based on configuration of a lock extension setting.

18. The data processing system of claim 15, wherein the garbage collector that is scheduled to run periodically is locked to prevent cancellation.

19. The data processing system of claim 15, wherein if an input is received to modify the period of the garbage collector that is within an upper limit, then a first garbage collection run after the input is received is performed based on the period, and subsequent garbage collection runs are performed based on the modified period.

20. The data processing system of claim 15, wherein the predetermined time frame is greater than a sum of a) the period, and b) an estimated or calculated time to perform garbage collection of the one or more data objects.

* * * * *